Oct. 10, 1939.        G. GAIDIES ET AL        2,175,345
ELECTRIC GASEOUS DISCHARGE DEVICE
Filed June 27, 1936
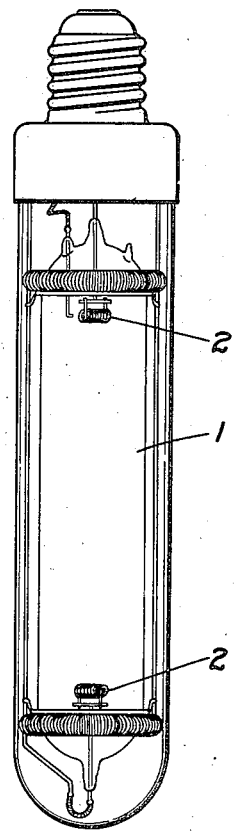
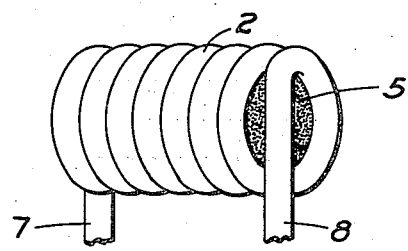
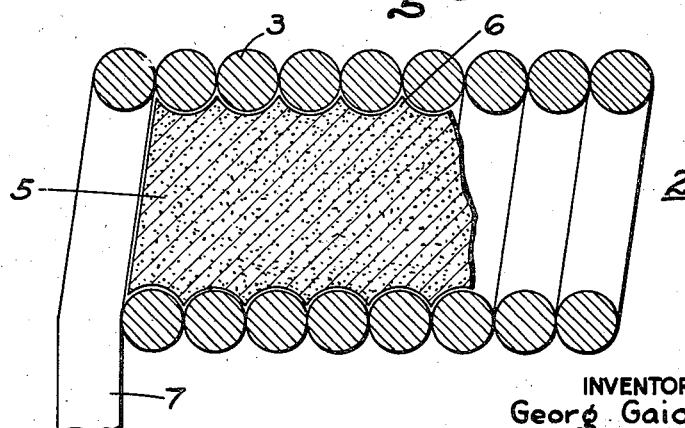
INVENTORS
Georg Gaidies
Hermann Krefft
Hermann Kummer
BY
*Harry E. Dunham*
ATTORNEY Patented Oct. 10, 1939

2,175,345

UNITED STATES PATENT OFFICE 2,175,345

ELECTRIC GASEOUS DISCHARGE DEVICE

Georg Gaidies, Berlin-Pankow, Hermann Krefft, Berlin-Friedrichshagen, and Hermann Kummer, Neuenhagen-Sud, near Berlin, Germany, assignors to General Electric Company, a corporation of New York Application June 27, 1936, Serial No. 87,768
In Germany July 12, 1935

1 Claim. (Cl. 176—126)

The present invention relates to electric gaseous discharge devices generally, and in particular to electrodes therefor.

A particular object of the present invention is to provide an electric gaseous discharge device which will have a long useful life. Another object of the invention is to provide an electric gaseous discharge device having a low breakdown potential. A further object of the invention is to provide a novel cathode for use in such a device. Another object of the invention is to provide a novel method of producing a thermionic cathode. Still other objects and advantages of the invention will appear from the following detailed description or from an inspection of the accompanying drawing.

The invention consists in the new and novel combination of elements, and in the novel steps of the method, as hereinafter set forth and claimed.

In the manufacture of gaseous electric discharge devices, such as the high intensity mercury lamps and the like, it is usual to use thermionic cathodes which are coated with or contain pellets of alkaline earth oxides. Such electrodes have been very successful and have gone into extensive use. We have now discovered, however, that these electrodes can be improved by utilizing a novel structure of our invention. With this novel structure a closely wound wire helix preferably of tungsten forms a hollow cylinder which is entirely filled with a sintered mixture of alkaline earth oxide and tungsten powder. It has been found that with this novel structure the tungsten helix is continuously maintained in a highly activated condition, and that the sputtering of the active material therefrom is greatly reduced, with the result that the life of this electrode is extremely long. It has also been found that the breakdown potential of a gaseous discharge device is greatly reduced where these novel electrodes are used, due to the highly activated surface thereof.

According to our invention this novel electrode is produced by first filling the tungsten helix with a paste formed by mixing the alkaline earth oxides and tungsten powder with alcohol and then heating the electrode in a neutral or reducing atmosphere to a temperature of the order of 1,700° C. or more to sinter the active material within the helix. In order to prevent escape of the active material therefrom during this process the helix is preferably closely wound, in some cases having its adjacent turns in contact with each other. In order to minimize the shrinkage of the active material during the sintering process it has been found especially desirable to presinter the alkaline earth oxide and the tungsten powder before mixing into the paste which is placed within the helix, it having been found that under these circumstances the active material lies closely against the inner surface of the wire helix in the finished electrode, and thus is very effective in activating the surface of the tungsten helix. After the material has been sintered within the electrode the latter is sealed into the discharge device in any suitable manner.

We have found that one or more alkaline earth oxides, such as those of barium and strontium, can be used in these electrodes. Similarly acting substances, such as the carbonates of the alkaline earth metals, or the alkaline earth metals themselves, are also used where desired. In some cases a reducing metal such as aluminum is also added to the paste.

It has been found that electric gaseous discharge devices having these novel electrodes not only have an exceptionally long useful life, but that the breakdown potential thereof is materially lower than is obtainable with the electrodes of the prior art. It is believed that this lower breakdown potential results from the alloying of the helix with the alkaline earth metal of the sintered mixture, with which it is in intimate contact, during the sintering of the mixture.

For the purpose of illustrating our invention we have shown a preferred embodiment thereof in the accompanying drawing in which:

Fig. 1 is an elevational view of a high intensity mercury vapor arc lamp having a pair of these novel cathodes sealed therein, Fig. 2 is an enlarged perspective view of the cathode used in the device in Fig. 1 and Fig. 3 is an enlarged sectional view of the cathode of Fig. 2.

As shown in this drawing the mercury vapor lamp I has a cathode 2 sealed into each end thereof in the usual manner. As best shown in Figs. 2 and 3 these electrodes 2 consist of a tightly wound helix of tungsten wire having the adjacent turns directly in contact with each other. The entire space within this helix is filled with a highly active electron emitting mixture 5 of sintered alkaline earth oxides and tungsten powder. As shown in Fig. 3 this mixture also fills the grooves 6 between individual turns 3 of the tungsten helix, and thus is in direct contact with the entire inner surface of the wire helix, the space between the mixture 5 and the turns 3 being greatly exaggerated in the drawing. Since the member 5 is sintered after it has been introduced within the helix the surface of the sintered body is shaped like a screw, whereby it is anchored immovably within the helix. The ends 7 and 8 of the wire helix serve to mount the electrode on a suitable inlead. As shown these electrodes are arranged to be heated by the discharge, but it is to be understood that they can also be heated by an external source of current, where desired, by providing inleads for each of the ends 7 and 8.

While we have described our invention by reference to a specific embodiment thereof it is to be understood that our invention is not limited thereto, but that various changes, omissions and substitutions in the structure and in the method of making the same, within the scope of the appended claim, can be made without departing from the spirit thereof.

What we claim as new and desire to secure by Letters Patent of the United States is:

The method of producing a thermionic cathode which comprises sintering a mixture of an alkaline earth compound and tungsten powder, making the sintered material into a paste, placing said paste within a tungsten helix to completely fill the space therein and again sintering said material in a non-oxidizing atmosphere.

GEORG GAIDIES.
HERMANN KREFFT.
HERMANN KUMMER.